(12) United States Patent  
Kehoe et al.

(10) Patent No.: US 9,810,377 B2  
(45) Date of Patent: Nov. 7, 2017

(54) SYSTEM AND METHOD FOR IMPROVING THE ACCURACY OF A RATE OF DECAY (ROD) MEASUREMENT IN A MASS FLOW CONTROLLER

(71) Applicant: Illinois Tool Works Inc., Glenview, IL (US)

(72) Inventors: Anthony Kehoe, Glenview, IL (US); John Lull, Glenview, IL (US); Bill Valentine, Glenview, IL (US); Chris Ellec, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 65 days.

(21) Appl. No.: 14/378,539

(22) PCT Filed: Mar. 4, 2013

(86) PCT No.: PCT/US2013/028897  
§ 371 (c)(1),  
(2) Date: Aug. 13, 2014

(87) PCT Pub. No.: WO2013/134136  
PCT Pub. Date: Sep. 12, 2013

(65) Prior Publication Data  
US 2015/0027558 A1 Jan. 29, 2015

Related U.S. Application Data

(60) Provisional application No. 61/608,000, filed on Mar. 7, 2012.

(51) Int. Cl.  
*F17D 5/00* (2006.01)  
*G01F 1/696* (2006.01)  
(Continued)

(52) U.S. Cl.  
CPC ............. *F17D 5/00* (2013.01); *G01F 1/6965* (2013.01); *G01F 5/00* (2013.01); *G01F 15/005* (2013.01);  
(Continued)

(58) Field of Classification Search  
CPC ....... F17D 5/00; G05D 7/0635; G01F 15/005; G01F 1/6965; G01F 1/36; G01F 1/6847;  
(Continued)

(56) References Cited

U.S. PATENT DOCUMENTS 4,605,165 A    8/1986   Van Loveren et al.  
4,928,524 A *   5/1990   Sugi ........................ G01F 15/08  
                                                                                         73/114.01  
(Continued)

OTHER PUBLICATIONS

International Search Report and Written Opinion date mailed May 21, 2013 for International PCT Application PCT/US2013/028897.

*Primary Examiner* — Michael R Reid  
(74) *Attorney, Agent, or Firm* — McGuireWoods LLP

(57) ABSTRACT

A mass flow controller includes at least one conduit having a fluid inlet and a fluid outlet, the conduit defining a flow path along which the fluid flows. The mass flow controller also includes a modified inlet block having an inlet aperture, an inlet channel, and a reservoir fluidly coupled to the inlet channel and the conduit that enhances flow through the controller and improves rate-of-decay measurements. The mass flow controller includes at least one flow sensor that generates a flow sensor signal that is proportional to the mass flow rate of the fluid through the conduit. The mass flow controller includes a control subsystem coupled to a flow sensor and a valve assembly to control flow through the conduit.

17 Claims, 9 Drawing Sheets

(51) Int. Cl.
*G01F 5/00* (2006.01)
*G01F 15/00* (2006.01)
*G05D 7/06* (2006.01)

(52) U.S. Cl.
CPC ...... *G05D 7/0635* (2013.01); *Y10T 137/0402* (2015.04); *Y10T 137/7784* (2015.04); *Y10T 137/8175* (2015.04)

(58) Field of Classification Search
CPC ................ G01F 1/88; Y10T 137/7784; Y10T 137/0402; Y10T 137/8175; Y10T 137/7761; Y10T 137/7758; Y10T 137/776; Y10T 137/7759
USPC ......... 137/487.5, 485, 487, 497, 552, 15.01; 73/202, 861.52, 715, 716, 721, 727, 736
See application file for complete search history.

(56) References Cited

U.S. PATENT DOCUMENTS

| | | | | |
|---|---|---|---|---|
| 5,220,830 | A * | 6/1993 | Bonne | G01F 1/684 73/198 |
| 5,730,181 | A * | 3/1998 | Doyle | B01D 53/0415 137/487.5 |
| 6,116,283 | A * | 9/2000 | Yamaji | G05D 7/0635 137/271 |
| 6,244,293 | B1 * | 6/2001 | Azima | G05D 7/0635 137/486 |
| 6,826,953 | B2 * | 12/2004 | Wang | G01F 5/00 73/202.5 |
| 7,591,177 | B2 * | 9/2009 | Sugimoto | G01F 1/6847 73/204.27 |
| 2002/0050299 | A1 | 5/2002 | Nguyen | |
| 2003/0115949 | A1 | 6/2003 | Ambrosina et al. | |
| 2006/0011237 | A1 | 1/2006 | Tison et al. | |
| 2006/0081045 | A1 | 4/2006 | Robertson | |
| 2011/0011183 | A1 | 1/2011 | Monkowski et al. | |

\* cited by examiner

SYSTEM AND METHOD FOR IMPROVING THE ACCURACY OF A RATE OF DECAY (ROD) MEASUREMENT IN A MASS FLOW CONTROLLER

BACKGROUND OF THE INVENTION

1. Field of the Invention

The present invention relates generally to methods and systems for determining the mass flow rate of a fluid, and more particularly to the operation of mass flow controllers.

2. Discussion of the Related Art

Many industrial processes require precise control of various process fluids. For example, in the semiconductor industries, mass flow controllers are used to precisely measure and control the amount of a process fluid that is introduced to a process chamber. The term fluid is used herein to describe any type of matter in any state that is capable of flow. It is to be understood that the term fluid applies to compressible fluids, such as gases and vapors, to which controlled flow may be of interest.

Rate of Decay (ROD) measurements are a known method used to calibrate a variety of flow measurement devices including those utilized in mass flow controllers.

The disclosed embodiments include a system and method for improving the accuracy of a ROD measurement for real time correction in a mass flow controller by modifying the flow path of a mass flow controller to improve the accuracy for the ROD measurement.

SUMMARY

According to an illustrative embodiment, a system for determining a flow rate of a fluid includes at least one conduit comprising a fluid inlet and a fluid outlet. The conduit defines a flow path along which the fluid flows. The system further includes an inlet block including an inlet aperture, an inlet channel, and a reservoir having one or more chambers that are fluidly coupled to the inlet channel and the conduit. The reservoir is sized and configured, based on the operating conditions of the system, to enable a rate of decay measurement to be performed on the system without interrupting the flow of fluid delivered to the fluid outlet. The system also includes a pressure sensor that generates a pressure signal that is indicative of the pressure of the fluid in the conduit. The pressure sensor is coupled to a controller that is operable to generate a pressure measurement based on the pressure sensor signal. In addition, the system includes at least one flow sensor that generates a flow sensor signal, which is proportional to the flow rate of the fluid through the conduit. The at least one flow sensor is coupled to a controller that is operable to generate a flow sensor based flow rate for the fluid, which is determined at least in part from the flow sensor signal.

According to another illustrative embodiment, a method of manufacturing a mass flow controller includes providing a block to secure components of the mass flow controller and forming at least one conduit comprising a fluid inlet and a fluid outlet to define a fluid flow path. The method also includes providing an inlet block comprising the fluid inlet, an inlet channel fluidly coupled to the fluid inlet, and a reservoir fluidly coupled to the inlet channel. The reservoir is sized and configured, based on operating conditions, to enable a rate of decay measurement to be performed without interrupting the flow of fluid to the fluid outlet. In addition, the method includes providing at least one flow sensor that generates a flow sensor signal proportional to the flow rate of fluid through the conduit and coupling the at least one flow sensor to a control subsystem that is operable to receive the flow sensor signal and generate a flow sensor based flow rate for the fluid. The method also includes providing a pressure sensor that generates a pressure sensor signal indicative of the pressure of the fluid in the conduit and coupling the pressure sensor to a control subsystem that is operable to receive the pressure sensor signal and generate a pressure measurement for the fluid. The method further includes coupling a valve assembly to the block and establishing a communicative coupling between the control subsystem and the valve body, wherein the control subsystem is operable to control the valve assembly to adjust the rate of fluid through the conduit.

In another illustrative embodiment, a mass flow controller includes at least one conduit having a fluid inlet and a fluid outlet, the conduit defining a flow path along which the fluid flows. The mass flow controller also includes an inlet block having an inlet aperture, an inlet channel, and a reservoir fluidly coupled to the inlet channel and the conduit. The reservoir is sized and configured, based on operating conditions, to facilitate rate of decay measurement of the fluid in the conduit while the mass flow controller is operational. The mass flow controller includes at least one flow sensor that generates a flow sensor signal that is proportional to the flow rate of the fluid through the conduit and a pressure sensor that generates a pressure sensor signal indicative of the pressure of the fluid in the conduit. The at to least one flow sensor is coupled to a controller that is operable to generate a flow sensor based flow rate for the fluid, and the flow sensor based flow rate is determined at least in part from the flow sensor signal. The pressure sensor is coupled to a controller that is operable to generate a pressure sensor based pressure measurement. In addition, the mass flow controller includes a control subsystem coupled to the at least one flow sensor and a valve assembly communicatively coupled to the control subsystem and operable to adjust the rate of fluid through the conduit.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for improving the accuracy of a ROD measurement for real time correction in a mass flow controller by modifying an inlet block of a mass flow controller to increase the volume of available fluid, which is generally a compressible gas, for the ROD measurement.

In addition, the disclosed embodiments include a system and method for improving the accuracy of a ROD measurement by utilizing filler material to increase the surface area within the volume of an inlet block for keeping the fluid temperature constant during the pressure decay.

The disclosed embodiments and advantages thereof are best understood by referring to FIGS. 1-17 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages will be included within the scope of the disclosed embodiments. Further, the illustrated figures are only exemplary and are not intended to assert or imply any limitation with regard to the environment, architecture, design, or process in which different embodiments may be implemented.

Figure 1:
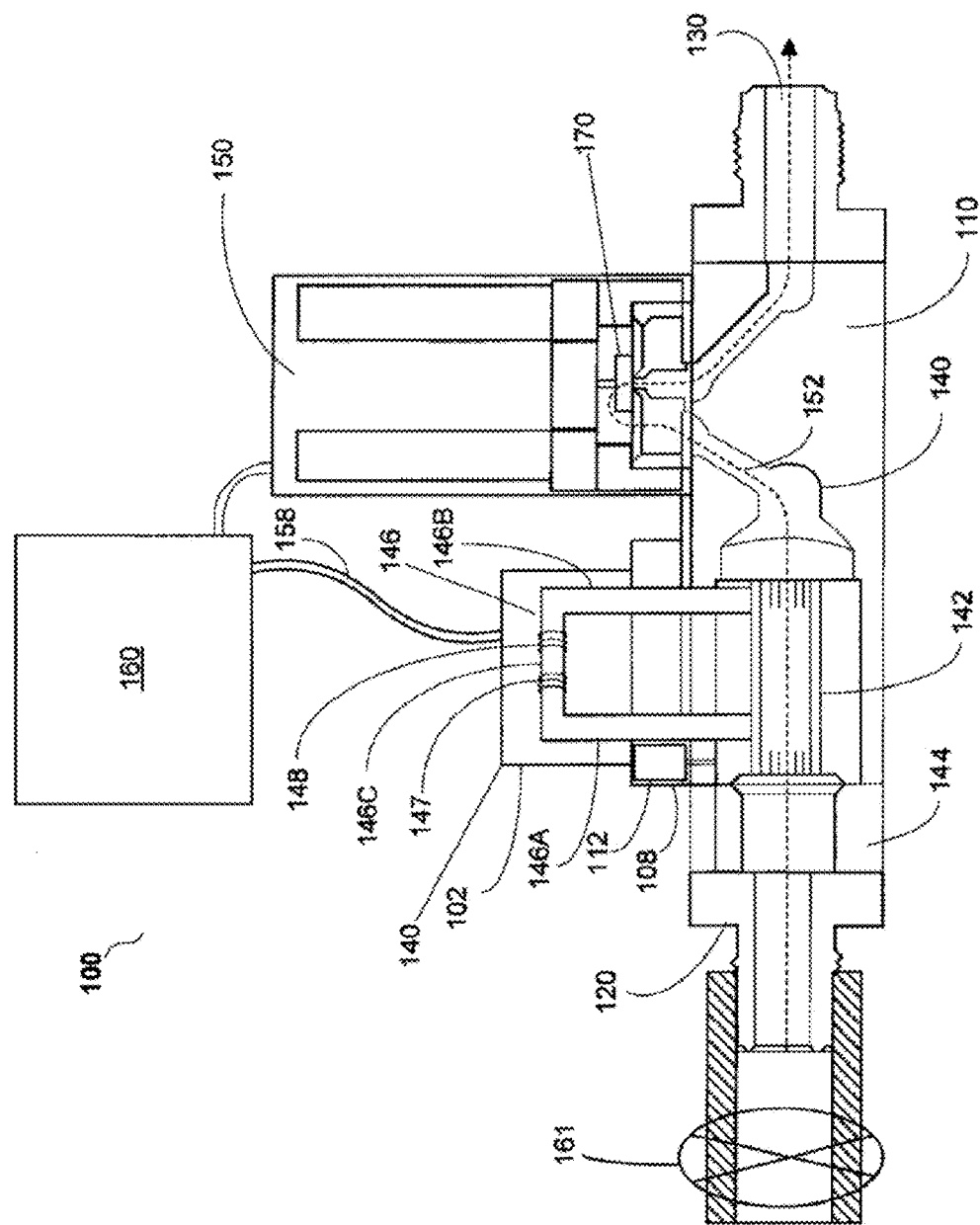
FIG. 1 is a schematic view, in partial cross section of a mass flow controller.

FIG. 1 shows schematically a typical mass flow controller 100 that includes a block 110, which is the platform on which the components of the mass flow controller are mounted. A thermal mass flow meter 140 and a valve assembly 150 containing a valve 170 are mounted on the block 110 between a fluid inlet 120 and a fluid outlet 130. The thermal mass flow meter 140 includes an inlet block 144 that couples the fluid inlet 120 to a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or sensor base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistive winding 147 toward the downstream resistive winding 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147,148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, and other factors.

The process of correlating raw sensor output to fluid flow entails tuning and/or calibrating the mass flow controller 100 and is an expensive, labor intensive procedure, often requiring one or more skilled operators and specialized equipment. For example, the mass flow meter 140 may be tuned by running known amounts of a known fluid through a thermal sensor portion 146 and adjusting certain signal processing parameters to provide a response that accurately represents fluid flow. The output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

The bypass 142 may be coupled to the sensor 146 and tuned with the known fluid to determine an appropriate relationship between fluid flowing in the mass flow meter 140 and the fluid flowing in the bypass 142 at various known flow rates, so that the total flow through the flow meter 140 can be determined from the sensor output signal. In some mass flow controllers, no bypass is used and the entire flow passes through the thermal sensor 146. The mass flow sensor 146 portion and bypass 142 may then be mated to the base 110 of the mass flow controller 100 with the control valve 170 and control electronics 160 portions and then tuned again, under known conditions. The responses of the control electronics 160 and the control valve 150 are then characterized so that the overall response of the system to a change in set point or input pressure is known, and the response can be used to control the system to provide the desired response. It is noted that while the thermal sensor 146 is described as a sensor for detecting a flow rate through a portion of the mass flow controller 100, any suitable sensor may be substituted. For example, a coriolis sensor may be used in place of the thermal sensor 146.

When the type of fluid used by an end-user differs from that used in tuning and/or calibration, or when the operating conditions, such as inlet and outlet pressure, temperature, and range of flow rates, used by the end-user differ from that used in tuning or calibration, the operation of the mass flow controller 100 is generally degraded. For this reason, the flow meter 140 can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

Control electronics 160 control the position of the control valve 170 in accordance with a set point that corresponds to the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller 100. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor 146. The control valve 150 is positioned in a main fluid flow path 152 (typically downstream of the bypass 142 and mass flow sensor 146) and can be controlled (e.g., opened or closed) to vary the mass flow rate of fluid flowing through the main fluid flow path 152, the control being provided by the mass flow controller 100.

In the illustrated example, the flow rate is supplied by electrical conductors 158 to a closed loop system controller 160 as a voltage signal. The signal is amplified, processed and supplied to the control valve assembly 150 to modify the flow. To this end, the controller 160 compares the signal from the mass flow meter 140 to predetermined values and adjusts the control valve 170 accordingly to achieve the desired flow.

The control valve 170 is positioned in the main fluid flow path (typically downstream of the bypass 142 and thermal mass flow meter 146) and can be controlled (e.g., opened or closed) to vary the mass flow rate of fluid flowing through the main fluid flow path and provided by the mass flow controller through the outlet 180. The valve 170 is typically controlled by a valve actuator, examples of which include solenoid actuators, piezoelectric actuators, stepper actuators, etc.

In an embodiment, the mass flow controller 100 also includes a pressure sensor 112, which is a pressure transducer coupled to flow path at some point, typically, but not limited to, upstream of the bypass 142 to measure pressure in the flow path. Pressure sensor 112 provides a pressure signal indicative of the pressure that can be used to derive a number of measurements, such as ROD when an upstream isolation valve 161 is closed during the operation of the mass flow controller 100.

Controller 160 includes control electronics to control the position of the control valve 170 based upon a set point that is indicative of the mass flow rate of fluid desired to be provided by the mass flow controller 100, and a flow signal from the thermal mass flow meter 146 indicative of the actual mass flow rate of the fluid flowing in the sensor conduit.

Figure 2:
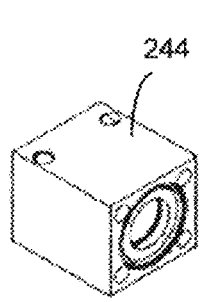
FIG. 2 is a perspective view of an embodiment of an inlet block of a mass flow controller.
Figure 3:
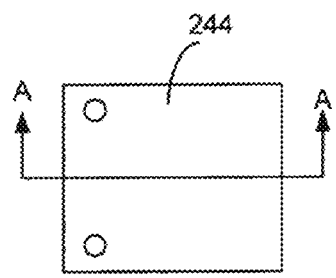
FIG. 3 is a top view of the inlet block of FIG. 2.
Figure 3A:
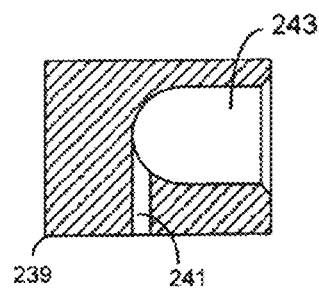
FIG. 3A is a section view of the inlet block presented in FIG. 2.
Figure 4:
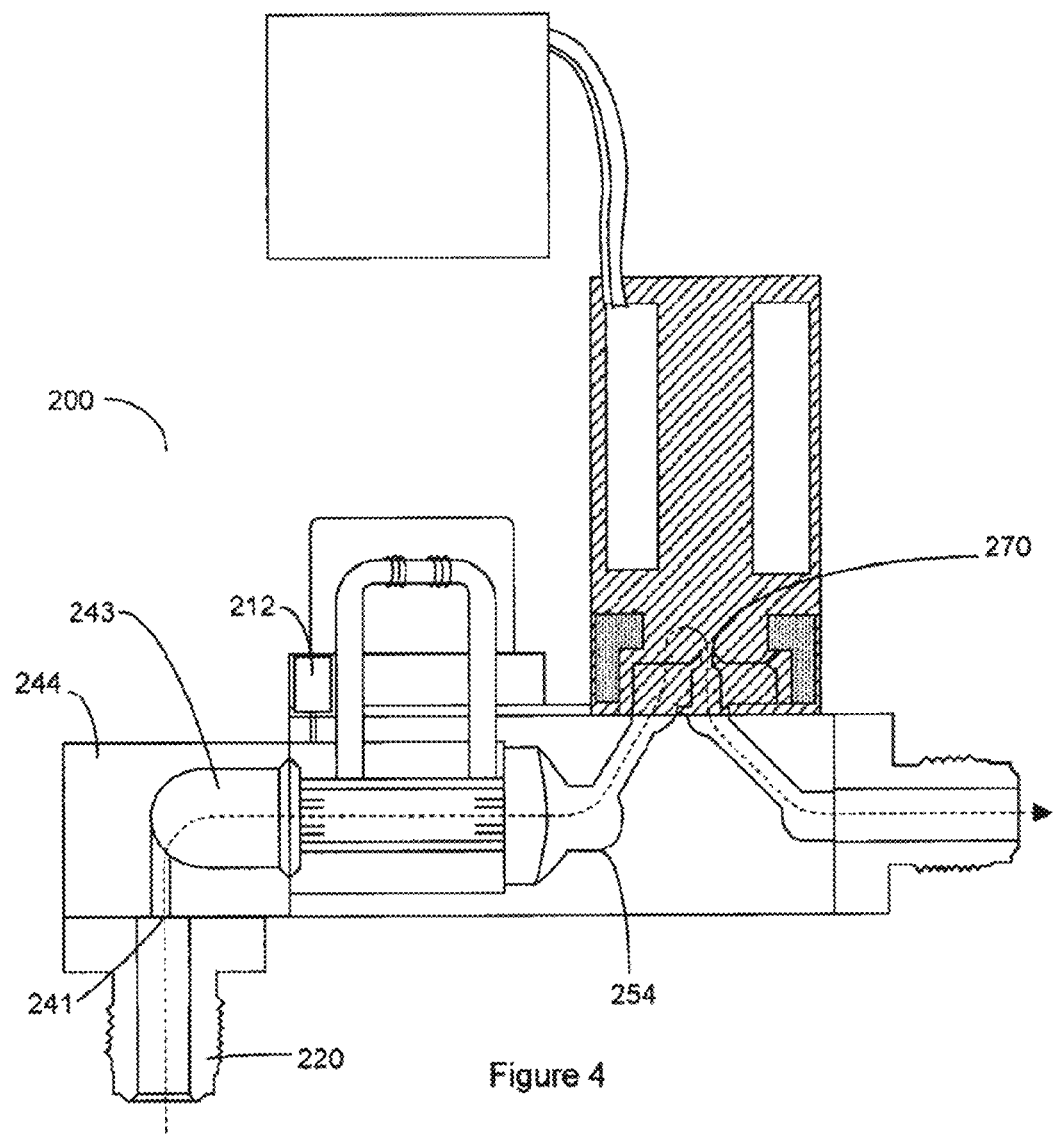
FIG. 4 is a schematic view, in partial cross section, of a mass flow controller having the inlet block of FIGS. 2-3A.

As shown in FIGS. 2-3A, the inlet block 244 may be configured such that an inlet aperture 241 is located at the base surface 239 of the inlet block so that fluid may be routed into the inlet block 244 along a path that makes a 90 degree turn into an inlet channel 243. FIGS. 2-4 illustrate such an inlet block 244 and FIG. 3A shows an internal volume of the inlet block 244. FIG. 4 shows a mass flow controller 200 that includes the inlet block 244 of FIGS. 2-3A.

The ROD measurement may be used to calibrate a variety of flow measurement devices, including those utilized in the mass flow controller 200. In a typical ROD measurement, the mass flow controller 200 shuts off the upstream isolation valve (not shown) to isolate the mass flow controller 200 at the fluid inlet 220. After the mass flow controller 200 is isolated, the ROD can be determined by using the pressure sensor 212 to measure the pressure decay in the mass flow controller's internal volume that is upstream of the control valve 270. It is recognized that the amount of gas available in the closed volume of the conduit 254 upstream of the control valve 270 directly controls the amount of time that is available for a pressure decay measurement because a greater volume of fluid will take a greater time to bleed off than would a lower volume of fluid through the same flow path.

When implemented as an on-line process in a mass flow controller, ROD measurements present a variety of challenges. First, as most systems that use the mass flow controller 200 require the mass flow controller 200 to maintain the process flow to within one percent of set point, use of an ROD measurement process that introduces a significant flow disturbance may interfere with the functionality of the system. Second, the upstream isolation valve may not close instantaneously or in a precisely repeatable fashion. Isolation valve closure times as long as 100 milliseconds have been measured for some typical isolation valves, and this closure time can vary by ten percent. At low flow rates, the isolation valve may be kept closed so that measured pressure drop significantly exceeds the noise level of the pressure signal. To prevent excessively large run times for low flow rates, mass flow controllers with smaller volumes upstream of the pressure sensor 212 may be used. Such reduced volumes are usually achieved by reducing the volume of the inlet block, which is upstream of the pressure sensor 212. However, reducing the volume of the conduit upstream of the pressure sensor 212 reduces the maximum flow rate that can be measured with a ROD measurement. In addition, Temperature fluctuations will be induced both during the pressure decay when the isolation valve is closed and then again during the pressure increase when the isolation valve is opened. As described in more detail below, these temperature fluctuations can also induce a significant error into the ROD flow estimate if not accounted for.

Figure 5:
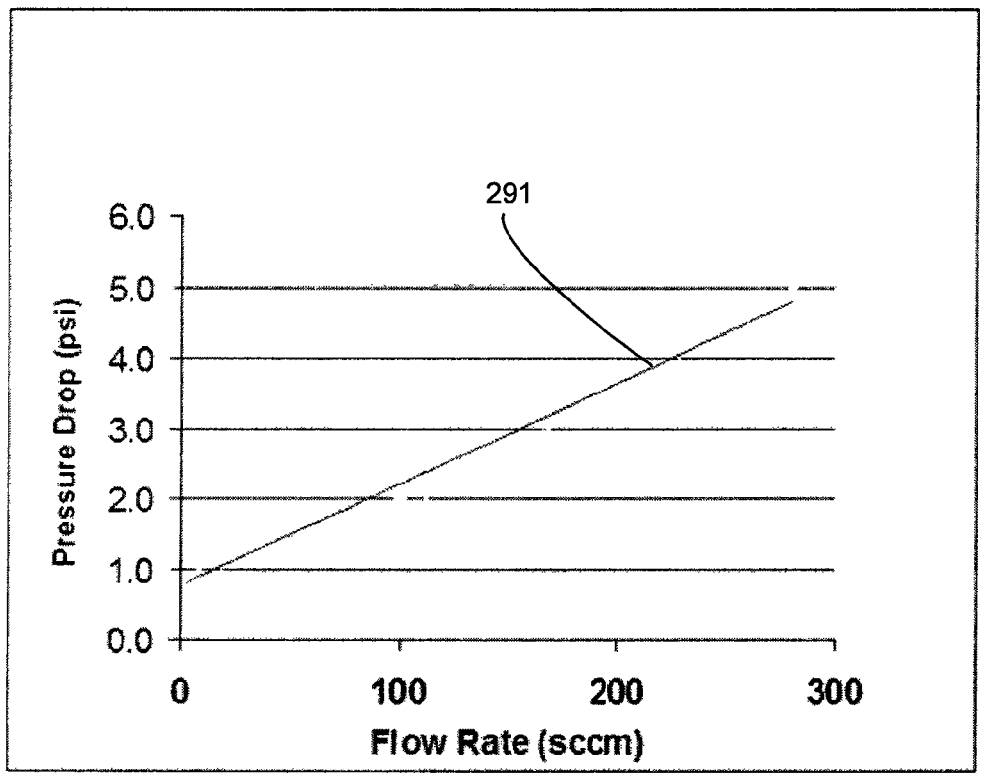
FIG. 5 is a graph illustrating the amount of pressure drop necessary to obtain a rate-of-decay flow estimate with 0.25% repeatability at a 95% Confidence Level for a mass flow controller having an inlet volume of 12.26 cubic centimeters.

FIG. 5 is a graph illustrating the amount of pressure drop necessary to obtain a ROD flow estimate with 0.25% repeatability at a 95% Confidence Level for a mass flow controller having an inlet volume of 12.26 cm$^3$ using a straight-line curve fit 291. As referenced herein, the inlet volume is understood to include the volume of the flow path, or conduit, between the upstream isolation valve and the pressure sensor 212. An accurate estimate of the run time necessary to obtain the required pressure drop can be obtained via the ideal gas law as:

$$\Delta t = \frac{Vol \, \Delta p \, T_{ref}}{T_{act} \, Q_{ref} \, P_{ref}} \quad \text{(Equation 1)}$$

where:

$\Delta t$=run time necessary to obtain 0.25% repeatability at the 95% Confidence Level, Vol=total decay volume (volume of the portion of the conduit within the inlet block and other internal volume upstream of the valve), $\Delta p$=pressure drop necessary to obtain 0.25% repeatability at the 95% Confidence Level, $T_{act}$=actual gas temperature in absolute temperature units, $T_{ref}$=reference gas temperature in absolute temperature units (273.15° K) in accordance with SEMI Specification E12-96, $P_{ref}$=reference gas pressure in absolute pressure units (14.696) in accordance with SEMI Specification E12-96, and $Q_{ref}$=the gas volumetric flow rate at standard density (the density of an equivalent ideal gas at standard temperature and pressure) in accordance with SEMI Specification E12-96

Figure 6:
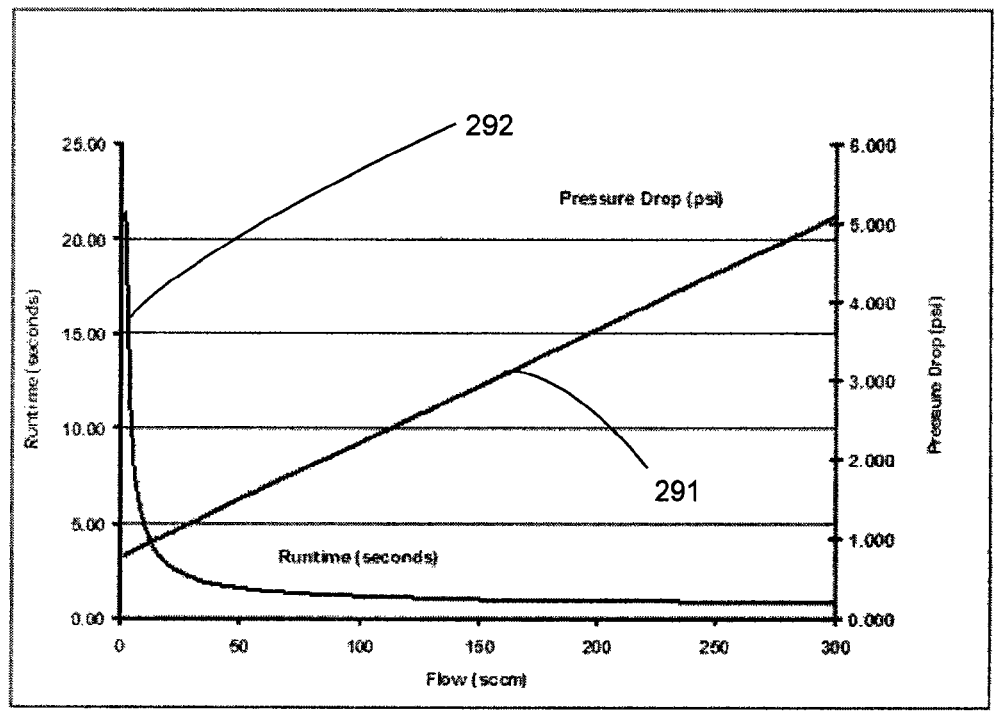
FIG. 6 is a graph illustrating a straight line fit of the pressure drop curve shown in FIG. 5 along with an estimate of the run time required to obtain a suitably accurate rate of decay measurement over the same time period.

If Equation 1 is applied to the straight line fit 291 of the pressure drop curve in FIG. 5, then an accurate estimate of the run time required to obtain 0.25% repeatability at the 95% confidence level can be obtained and plotted as a curve 292 on a second y-axis as shown in FIG. 6. Examination of the run-time curve 292 of FIG. 6 reveals reasonable run times of, for example, less than five seconds, for flow rates greater than 50 sccm. However, in the system of FIGS. 5 and 6, the run time starts to become large as the flow rate decreases below 50 sccm. For example, the run time may be as long as 20 seconds for a 2 sccm flow.

In a system in which process steps are only five seconds long that seeks to implement ROD flow measurements while the system is active, a 20 second run time might not be acceptable. Thus, for mass flow controllers that will operate at flow rates that are significantly below 50 sccm in systems that use short cycle times, the volume of the fluid path within the inlet block inlet volume may be increased to provide more appropriate run times.

Figure 7:
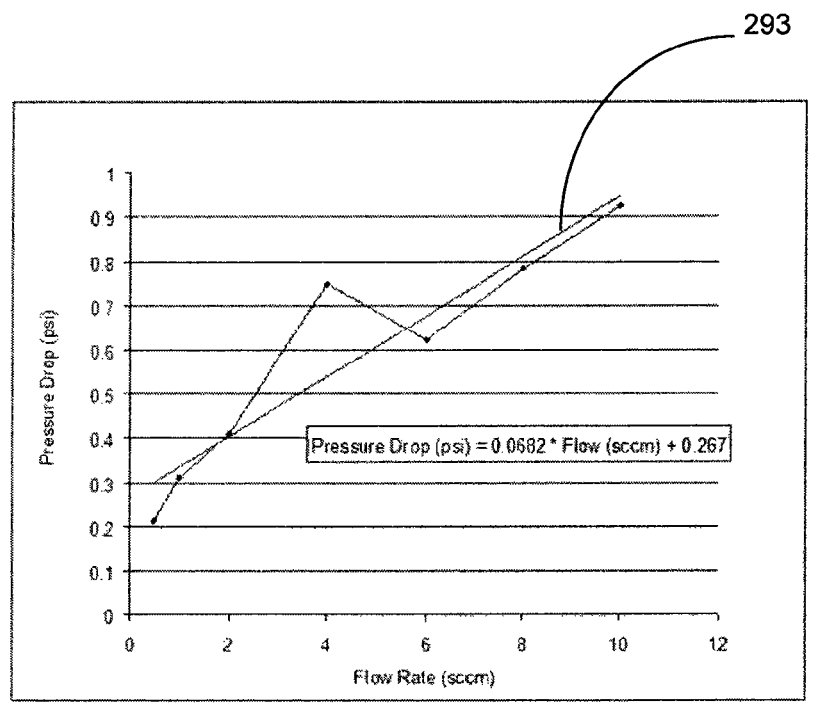
FIG. 7 is a graph illustrating the amount of pressure drop necessary to obtain a rate-of-decay flow estimate with 0.25% repeatability at a 95% Confidence Level for a mass flow controller having an inlet volume of 3.69 cubic centimeters.
Figure 8:
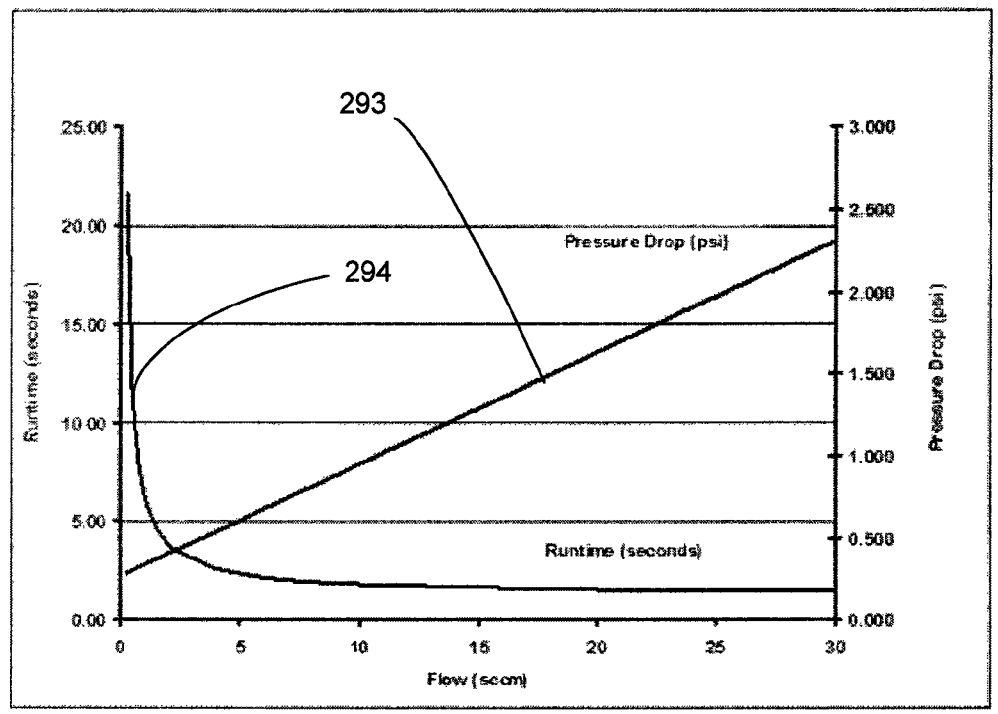
FIG. 8 is a graph illustrating a straight line fit of the pressure drop curve shown in FIG. 7 along with an estimate of the run time required to obtain a suitably accurate rate of decay measurement over the same time period.

To illustrate this concept, FIG. 7 shows the minimum pressure necessary to obtain a 0.25% repeatability at the 95% confidence level for a lower flow mass flow controller that has an inlet volume of 3.69 cm$^3$ and is analogous to FIG. 5. Application of Equation 1 to the straight line fit 293 shown in FIG. 7 results in the dual axis pressure drop and run time versus flow rate curve 294 shown in FIG. 8. Examination of the run time curve 294 of FIG. 8 shows a much more reasonable run time of approximately 4 seconds for a 2 sccm flow as compared to the 20 second run time associated with the larger 12.126 cm$^3$ inlet volume described with regard to FIG. 6. Thus, a user or manufacturer may apply Equation 1 to size an inlet block so that an accurate ROD measurement is obtained within an appropriate time period for a given process.

Thus, taken as a whole, FIGS. 5-8 illustrate a method for carefully sizing an inlet volume to maintain reasonable run times over the flow rates of systems in which the mass flow controller will be used during ROD measurement, and to maintain reasonable pressure drops of, for example, typically less than 5 psi, depending on the speed of the microprocessor and the control algorithm.

Figure 10:
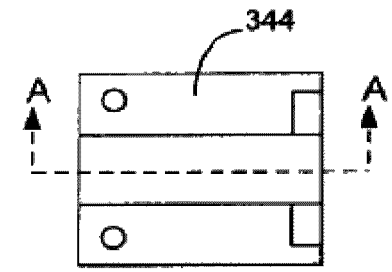
FIG. 10 is a top view of the inlet block of FIG. 9.
Figure 9:
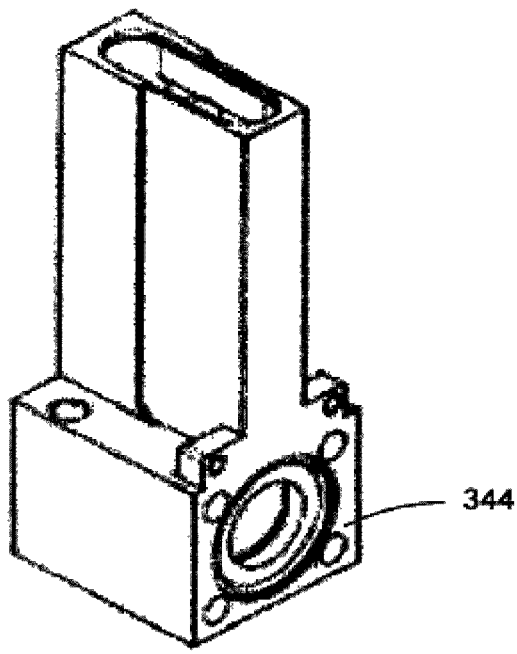
FIG. 9 is a perspective view of a modified inlet block in accordance with the disclosed embodiments.
Figure 10A:
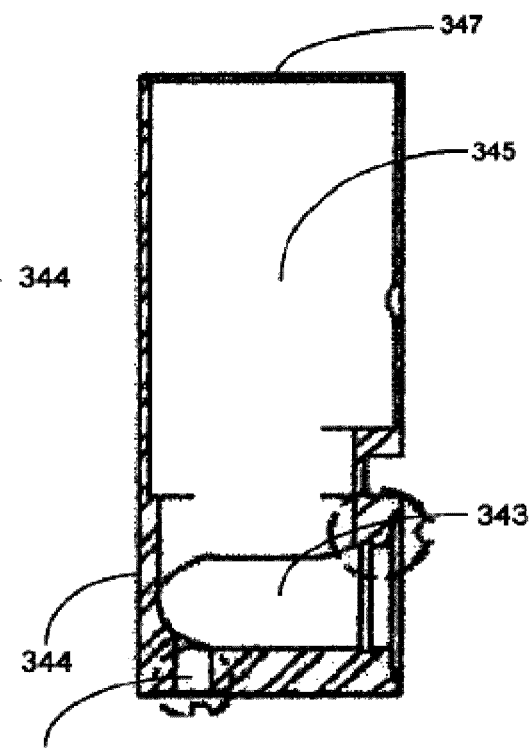
FIG. 10A is a section view of the inlet block presented in FIG. 9.
Figure 11:
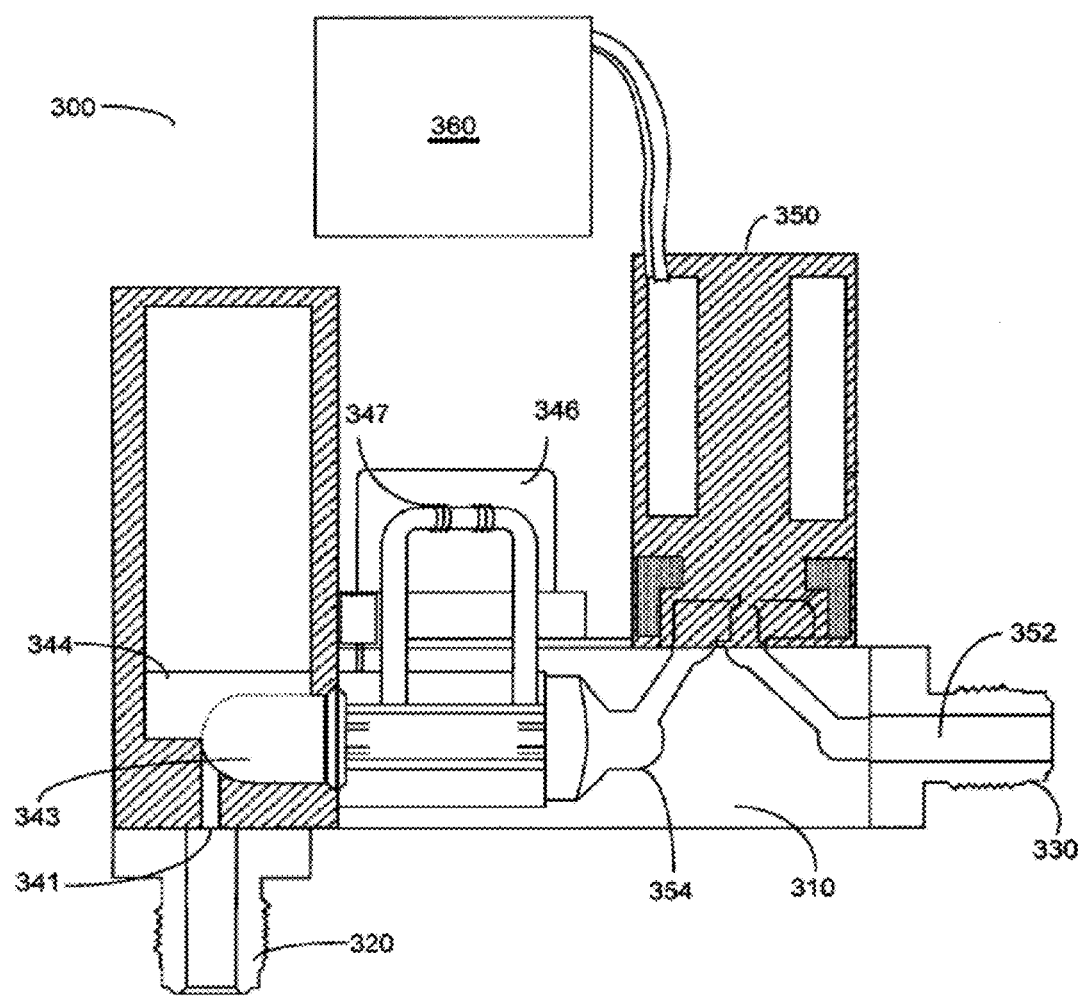
FIG. 11 is a schematic view, in partial cross section, of a mass flow controller having the inlet block of FIGS. 9-10A.

FIGS. 9-10A show an example of a modified inlet block 344 that provides for a mass flow controller having an increased inlet volume as compared to the basic inlet blocks illustrated in FIGS. 1-4. While largely similar to the inlet block 244 of FIGS. 1-4, the modified inlet block 344 includes a reservoir 345, as shown in FIG. 11. The reservoir enlarges enhances the inlet volume by increasing the size of the inlet volume, which is volume of the portion of the flow path that is within the mass flow controller upstream of the valve assembly 350. The reservoir 345 may also help to optimize the flow path of fluid through the mass flow controller 300 by minimizing increases or decreases in the flow rate that may be caused by changes to the temperature of the fluid in the conduit as described in more detail below. In the embodiment of FIG. 10A, the reservoir 345 has a simple, expansive shape, which is a relatively large hollow area adjacent to the inlet channel 343 of the inlet block 344. In an embodiment, the reservoir 345 has one or more chambers that are separated from the inlet channel 343 by a segment of the flow path 352.

Various internal volume configurations of the modified inlet block 344 of FIG. 9 may be implemented. For instance, the additional, non-limiting examples of modified inlet blocks described below exhibit alternative configurations for a modified inlet block having a reservoir adjacent to the inlet channel to enhance the inlet volume.

Referring again to FIG. 10A, a first exemplary cross-section of a modified inlet block 344 is shown. The example configuration of FIG. 10A shows a reservoir formed by a large, hollowed area that holds more volume of fluid than the open space of a traditional inlet block, and is fluidly coupled to the inlet aperture 341 and inlet channel 343 to route fluid into a mass flow controller. As used herein, the term "fluidly coupled" means that there is a sealed coupling between two or more elements, for example, the hollowed area and inlet channel, so that fluid may flow between the elements without significant seepage to the external environment.

It is noted that the inlet block 344, in addition to the other examples of inlet blocks described herein may be formed from any suitable material and any suitable manufacturing technique. For example, an inlet block may be formed from a plastic, ceramic, or a metal, such as a stainless steel, a high-performance alloy, or a corrosion-resistant alloy. As referenced herein, a "high-performance alloy" refers to corrosion-resistant metal alloys marketed by Haynes International as Hastelloy®, wherein the predominant alloying ingredient is typically the transition metal nickel and other alloying ingredients are added to nickel in varying percentages, including some or all of the elements of molybdenum, chromium, cobalt, iron, copper, manganese, titanium, zirconium, aluminum, carbon, and tungsten. In addition, an inlet block may be formed from a combination of the forgoing elements. In each case, the material used to form the inlet block may be selected based on the operating conditions of the mass flow controller, taking into account such considerations as operating temperature, composition of gas or fluid, and flow rate. In addition, the inlet block may be formed from machining one or more components of the inlet block from one or more sold pieces of material, a molding of casting process, a sintering process, or even a lithographic manufacturing process. When machined from a top view, the reservoir 345 may have an oval cross-section and be enclosed by a cover 347 that is mated to the top of the inlet block 344 using a joining process such as a weld, adhesive, a mechanical fastener such as a bolt or interlocking feature, or combination thereof.

Figure 12:
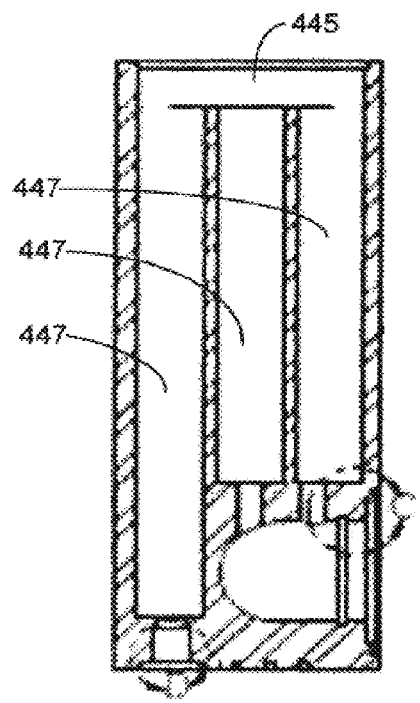
FIG. 12 is a section view of a modified inlet block, analogous to the inlet block of FIG. 10A, having a plurality of chambers.

Referring now to FIG. 12, another example of a modified inlet block 444 is shown. In this embodiment, the internal volume of the modified inlet block 444 includes a plurality of chambers 447 to direct the fluid flow path through the modified inlet block 444 and increase the internal surface area of the modified inlet block 444 that contacts the fluid. The chambers 447 may be arranged in series such that fluid flows through the reservoir 445 along a single flow path or with one or more of the chambers 447 arranged in parallel so that the fluid may flow through two or more of the chambers 447.

It is noted that changes of the temperature of a compressible gas in the modified inlet block 444 may cause the gas to expand or contract, and thereby result in unwanted variances in the flow rate. Because variations of the temperature of the gas or fluid in the conduit may adversely affect flow rate and ROD measurements, it may be desirable to avoid fluctuations in the temperature of the gas at points in the flow path that are upstream from the thermal sensor and mass flow meter. To avoid such unwanted fluctuations in temperature, the increased surface area, or contact area of the chambers 447 provides a heat exchanger interface between the fluid and the material that forms the modified inlet block 444 and thereby minimize changes in fluid temperature as the fluid moves along the surface of the modified inlet block 444. This heat exchanger interface will help in keeping the temperature of the fluid in the modified inlet block 444 constant during the pressure decay, thereby improving the accuracy of the rate-of-decay measurement by avoiding fluctuations in the rate that may have otherwise been cause by fluctuations in the temperature of the modified inlet block 444.

Figure 13:
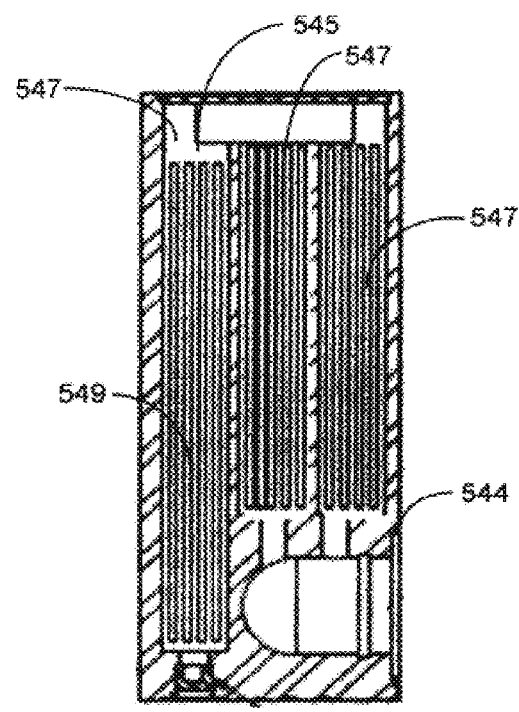
FIG. 13 is a section view of a modified inlet block, analogous to the inlet block of FIG. 10A, having a plurality of chambers that include tubes.

To increase the surface area of the internal volume of a modified inlet block 544, the reservoir 545 may also include tubes 549 or fins that enhance the ability of the modified inlet block 544 to function as a heat exchanger, as shown in FIG. 13. In the embodiment, the internal volume of the modified inlet block 544 includes a plurality of chambers 547 to direct the path of fluid flow through the inlet block. Within the chambers 547 are tubes 549 that further optimize the direction of the flow of the fluid and increase the surface area for keeping the fluid at a constant temperature during the pressure decay.

Figure 14:
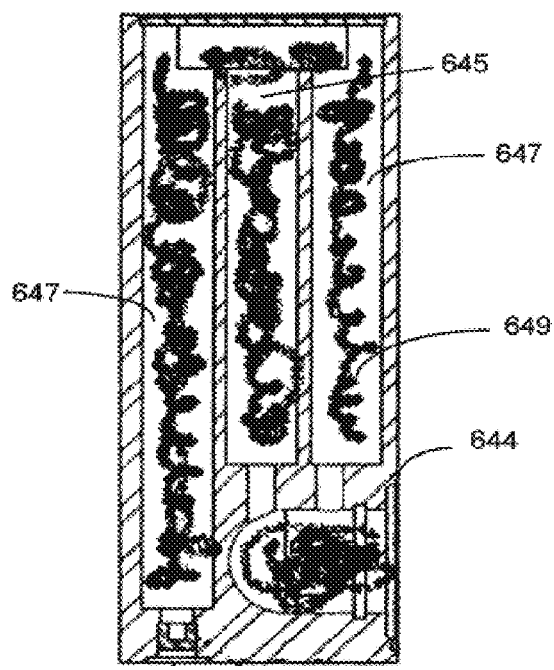
FIG. 14 is a section view of a modified inlet block, analogous to the inlet block of FIG. 10A, having a plurality of chambers filled with filler material.

FIG. 14 illustrates an example of an inlet block 644 with a plurality of chambers 647 having a filler material 649 inserted within the chambers 647. The inlet block 644 is otherwise similar in structure to the modified inlet block 444 presented in FIG. 12. A purpose of the filler material 649 is to increase the surface area of the reservoir 645 to keep the fluid temperature constant during pressure decay. However, in order to maintain a large volume size, the filler material 649 preferably has a high surface area to volume ratio to only slightly reduce the available volume while greatly increasing the surface area available as a heat exchanger interface between the fluid and, for example, the metal body of the inlet block 644. Examples of filler 649 material include, but are not limited to, machined surfaces in the tube volume that increase the number of chambers, small diameter, small wall thickness tubes parallel to the flow path, and steel wool type material (as illustrated in FIG. 14).

Figure 15:
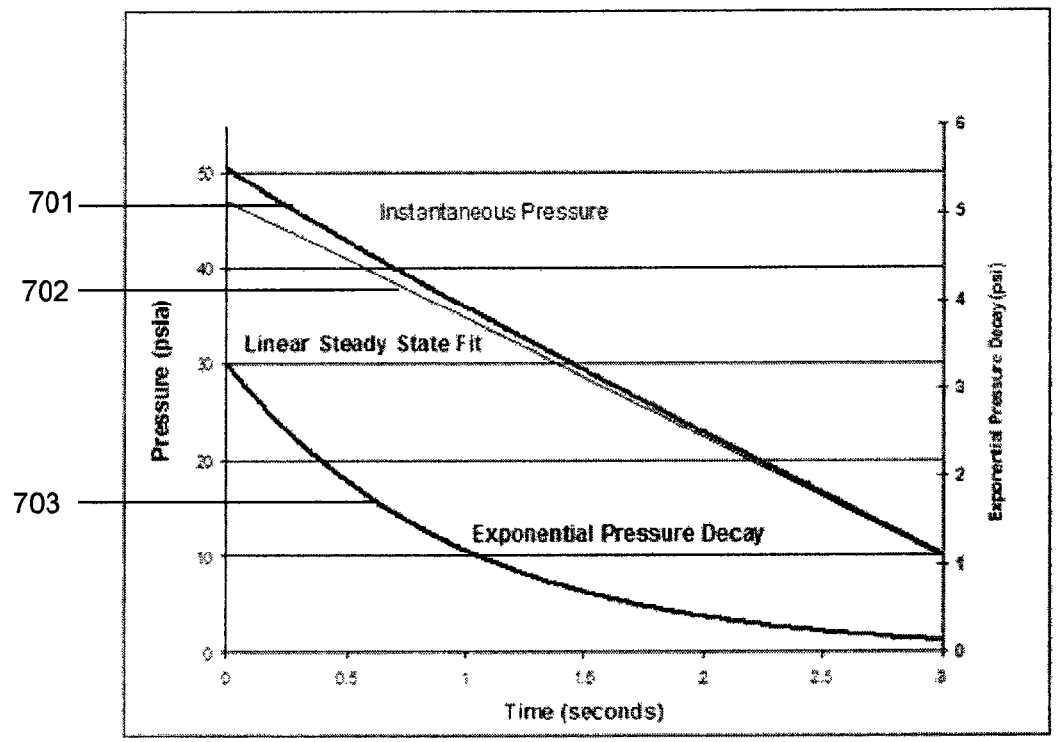
FIG. 15 is a graph showing pressure as a function of time curve for a 1 slpm system during a ROD measurement, where flow from the mass flow controller is kept within 1% of 1 slpm, for an enhanced inlet volume, as shown in FIG. 10.

FIG. 15 is a plot that illustrates the pressure as a function of time curve for a 1 slpm system during a ROD measurement in which flow from the mass flow controller is kept within 1% of 1 slpm. This data was obtained for an inlet volume of 19.12 $cm^3$ and a surface area of 46.6 $cm^2$, and having a configuration as shown in FIG. 10A. In FIG. 15, the uppermost curve 701 shows the actual pressure decay while the next curve 702 represents the fit of the pressure decay curve to the part of the pressure decay curve where the temperature is no longer changing (i.e., the "steady state" portion when time >3 seconds). The lowermost curve 703 represents the difference between the other curves and may be referred to as the exponential part of the pressure decay curve.

Many ROD flow measurement systems assume that the gas temperature is constant during the pressure decay (a "thermal steady-state model"), and simply multiply the measured pressure drop by a constant to obtain the measured flow rate. Where temperature variances exist such a simplified approach may result in an overestimate of the flow rate during the first approximately 2.0 seconds of the decay when temperature fluctuations are significant. In the exemplary system, the pressure decay at the start of the ROD measurement is 15.9 psi/sec at the start of the decay, which is a significant variation from the pressure decay computed by a thermal steady-state model, which would estimate a pressure drop of 12.4 psi/sec. Thus, not accounting for the temperature decay during the ROD measurement may result in a flow measurement error of as much as 28% for this particular combination of flow rates, gas, and mechanical parts.

Figure 16:
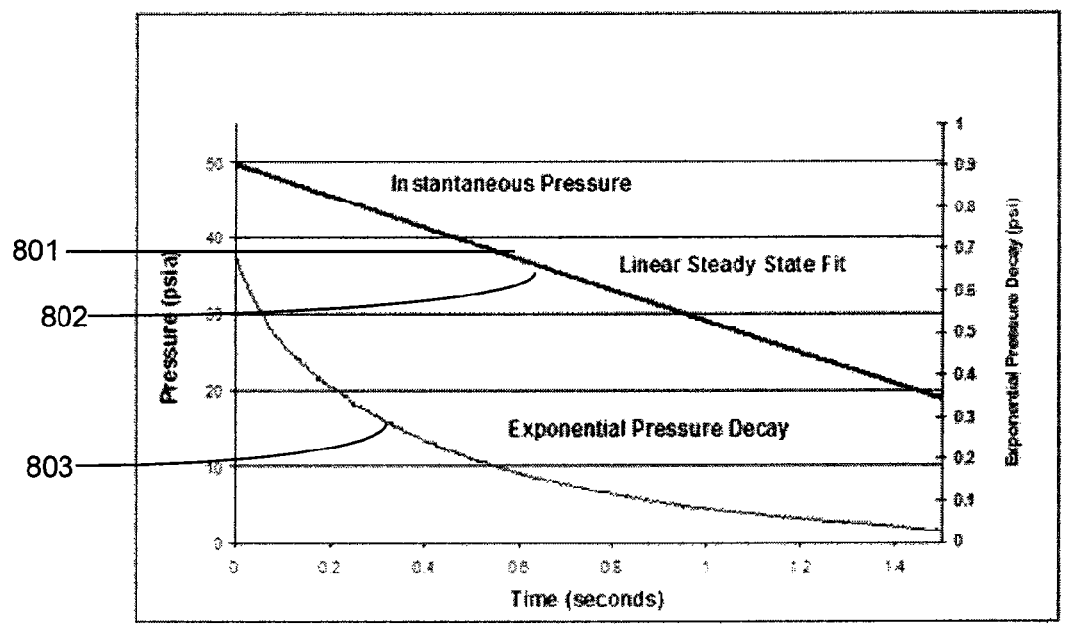
FIG. 16 is a graph showing a pressure decay curve for the inlet block having the type of inlet volume shown in FIG. 13.

FIG. 16 represents the pressure decay curve for an inlet block having a total inlet volume of 12.13 $cm^3$ and a surface area of 111.8 $cm^2$, and a configuration as shown in FIG. 13, which has a significant increase in surface area relative to volume as compared to the inlet volume configuration shown in FIG. 10A. Like FIG. 15, FIG. 16 shows the actual pressure decay 801, the linear steady-state calculated pressure decay 802, and the exponential pressure decay 803. FIG. 16 shows that the increased surface area causes the actual pressure decay curve 801 and linear steady-state pressure decay curve 802 to converge.

Figure 17:
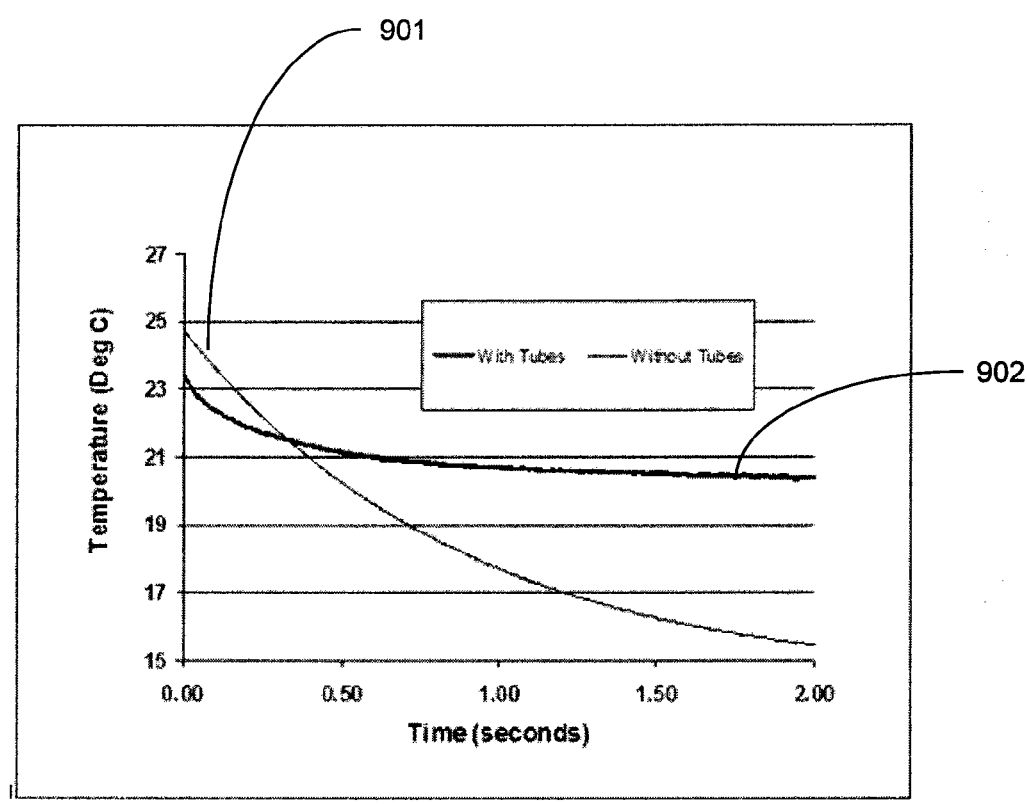
FIG. 17 is a graph showing the temperature decay for the pressure decays shown in FIGS. 15 and 16.

FIG. 17 shows the temperature decay for the pressure decays shown in FIGS. 15 and 16 (with temperature back calculated through via the measured pressure drop and the known volumes and flow rate). Here, a first curve fit 901 shows the temperature decay for an inlet volume having tubes, and a second curve fit 902 that shows the temperature decay for an inlet volume that does not include the tubes. As shown in FIGS. 16 and 17, the exponential temperature decay and the corresponding pressure decay has been significantly reduced by the addition of the increased surface area. While the difference between the transient and thermal steady-state slopes have been reduced (22.4 psi/sec versus 20.434 psi/sec), there is still a difference of approximately 10% in the two rates of pressure decay. This difference indicates that while modest surface area additions alleviate thermally induced Rate of Decay flow measurement errors, extremely aggressive surface area additions, such as those suggested and described above with regard to FIG. 14, may help to reduce thermal ROD errors to below 1% of set point in a mass flow controller that incorporates such features.

A method of manufacturing a mass flow controller 300, such as the mass flow controller 300 shown in FIG. 11, is also provided. The method includes providing a block 310 to secure components of the mass flow controller and forming at least one conduit 354 comprising a fluid inlet 320 and a fluid outlet 330 to define a fluid flow path 330. The method also includes providing a modified inlet block 344 comprising an inlet aperture 341, an inlet channel 343 fluidly coupled to the fluid inlet 320, and a reservoir 345 fluidly coupled to the inlet channel 343. In addition, the method includes providing at least one flow sensor 346 that generates a flow sensor signal proportional to the mass flow rate of fluid through the conduit 354, and coupling the at least one flow sensor 346 to a control subsystem 360 that is operable to receive the flow sensor signal and generate a flow sensor based mass flow rate for the fluid. The method also includes coupling a valve assembly 350 to the block 310 along the fluid flow path 352 and establishing a communicative coupling between the control subsystem 360 and the valve assembly 350, wherein the control subsystem 360 is operable to control the valve assembly 350 to adjust the rate of fluid through the conduit 354.

According to an illustrative embodiment, the step of providing an inlet block 344 having the inlet aperture 341, an inlet channel 343 fluidly coupled to the inlet aperture 341, and a reservoir 345 fluidly coupled to the inlet channel 343 may include providing an inlet block 344 having a reservoir 345 that comprises a hollowed area adjacent the inlet channel 343. The hollowed area may have an oval cross-section. In an embodiment, providing an inlet block 344 comprising the inlet aperture 341, an inlet channel 343 fluidly coupled to the inlet aperture 341, and a reservoir 345 fluidly coupled to the inlet channel 343 may comprise providing an inlet block 344 having a reservoir 345 that comprises a plurality of chambers (as shown in FIGS. 12-14). As previously discussed, the plurality of chambers may comprise tubes or any of the other features described herein.

Accordingly, as described above, advantages of the disclosed embodiments include, but are not limited to, improving the accuracy of a ROD measurement for real time correction in a mass flow controller by modifying an inlet block of a mass flow controller to increase the volume of available fluid for the ROD measurement. As such, it is noted that while the concepts described herein are described with regard to a mass flow controller, they may be applied in similar systems that include analogous elements. For example, instead of including a reservoir within an inlet block of a mass flow controller, a user may install a component having a reservoir, such as those described with regard to FIGS. 9-14, upstream of a flow sensor in a control system. In addition, a mass flow meter, or volume flow meter, may be assembled with the elements included in the systems described above to create a system having comparable functionality to the mass flow controller systems described herein and having a modified inlet block or other inlet volume that includes a reservoir.

While specific details about the above embodiments have been described, the above description is intended merely as an example embodiment and is not intended to limit the structure or implementation of the disclosed embodiments. For instance, it is noted that the volume does not necessarily need to be made as large as physically possible. For the lowest flow rates, too large of a volume will cause the measurement time to increase undesirably too long due to the increase wait time that's required for the pressure to decay with a very low flow.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

What is claimed:

1. A system for determining a flow rate of a compressible fluid, the system comprising:
   an upstream isolation valve, a conduit comprising a fluid inlet and a fluid outlet, the conduit defining a flow path along which the fluid flows;
   a mass flow controller located downstream from the upstream isolation valve along the conduit;
   an inlet block of the mass flow controller, the inlet block comprising an inlet passage, an inlet channel, and a reservoir comprising one or more chambers that are fluidly coupled to the inlet channel upstream from a location at which the inlet channel is fluidly coupled to a bypass of the conduit, wherein the reservoir is sized and configured, based on operating conditions, to enable a rate of decay measurement to be performed on the system without interrupting the flow of fluid delivered to the fluid outlet, and wherein the inlet block is formed from a single piece of material;
   wherein filler material is disposed within the reservoir;
   at least one pressure sensor that generates a pressure sensor signal that is indicative of the pressure of the fluid within the conduit, the at least one pressure sensor being coupled to a controller that is operable to generate a pressure sensor based pressure measurement for the fluid, the pressure sensor based pressure measurement being determined at least in part from the pressure sensor signal; and
   at least one flow sensor that generates a sensor signal that is indicative of a flow rate of the fluid through the conduit, the at least one flow sensor being coupled to a controller that is operable to generate a flow sensor based flow rate for the fluid, the sensor based flow rate being determined at least in part from the flow sensor signal.

2. The system for determining a flow rate of a compressible fluid of claim 1, wherein the reservoir comprises a hollowed area adjacent the inlet channel.

3. The system for determining a flow rate of a compressible fluid of claim 2, wherein the hollowed area is oval.

4. The system for determining a flow rate of a compressible fluid of claim 1, wherein the reservoir comprises a plurality of chambers.

5. The system for determining a flow rate of a compressible fluid of claim 4, wherein the plurality of chambers are arranged in series to define a fluid flow path.

6. The system for determining a flow rate of a compressible fluid of claim 4, wherein the plurality of chambers comprises one or more tubes.

7. A method of manufacturing a mass flow controller, the method comprising:

providing a block to secure components of the mass flow controller;

forming a conduit comprising a fluid inlet and a fluid outlet to define a fluid flow path;

providing an inlet block comprising an inlet passage, an inlet channel fluidly coupled to the fluid inlet, and a reservoir fluidly coupled to the inlet channel upstream from a location at which the inlet channel is fluidly coupled to a bypass of the conduit, wherein the reservoir is sized and configured, based on operating conditions, to enable a rate of decay measurement to be performed without interrupting the flow of fluid to the fluid outlet, and wherein the inlet block is formed from a single piece of material;

providing filler material within the reservoir;

providing at least one flow sensor that generates a flow sensor signal proportional to the flow rate of fluid through the conduit;

providing at least one pressure sensor that generates a pressure sensor signal that is indicative of the pressure of the fluid within the conduit, coupling the at least one flow sensor and the at least one pressure sensor to a control subsystem that is operable to receive the flow sensor signal and generate a flow sensor based flow rate for the fluid;

and coupling a valve assembly to the block and establishing a communicative coupling between the control subsystem and the valve assembly, wherein the control subsystem is operable to control the valve assembly to adjust the rate of fluid through the conduit.

8. The method of claim 7, wherein the reservoir comprises a hollowed area adjacent the inlet channel.

9. The method of claim 8, wherein the hollowed area is oval in cross-section.

10. The method of claim 7, wherein the reservoir comprises a plurality of chambers.

11. The method of claim 10, wherein the plurality of chambers comprise tubes.

12. A mass flow controller, comprising:

at least one conduit comprising a fluid inlet and a fluid outlet, the conduit defining a flow path along which the fluid flows;

an inlet block comprising an inlet passage, an inlet channel, and a reservoir fluidly coupled to the inlet channel upstream from a location at which the inlet channel is fluidly coupled to a bypass of the conduit, wherein the reservoir is configured, based on the operating conditions of the fluid, to facilitate a rate of decay measurement of the pressure of the fluid within the conduit while the mass flow controller is operational, and wherein the inlet block is formed from a single piece of material;

wherein filler material is disposed within the reservoir;

at least one pressure sensor that generates a pressure sensor signal that is indicative of the pressure of the fluid within the conduit, the at least one pressure sensor being coupled to a controller that is operable to generate a pressure sensor based pressure measurement for the fluid, the pressure sensor based pressure measurement being determined at least in part from the pressure sensor signal;

at least one flow sensor that generates a flow sensor signal indicative of a flow rate of the fluid through the conduit, the at least one flow sensor being coupled to a controller that is operable to generate a flow sensor based flow rate for the fluid, the flow sensor based flow rate being determined at least in part from the flow sensor signal;

a control subsystem coupled to the at least one flow sensor; and a valve assembly communicatively coupled to the control subsystem and operable to adjust the rate of fluid through the conduit.

13. The mass flow controller of claim 12, wherein the reservoir comprises a hollowed area adjacent the inlet channel.

14. The mass flow controller of claim 12, wherein the reservoir comprises a chamber.

15. The mass flow controller of claim 12, wherein the reservoir comprises a plurality of chambers.

16. The mass flow controller of claim 15, wherein the plurality of chambers are arranged in series to define a fluid flow path.

17. The mass flow controller of claim 15, wherein the inlet block is formed from a material selected from the group consisting of stainless steel, high performance alloy, a ceramic, and a plastic.

* * * * *

UNITED STATES PATENT AND TRADEMARK OFFICE
CERTIFICATE OF CORRECTION

PATENT NO. : 9,810,377 B2  
APPLICATION NO. : 14/378539  
DATED : November 7, 2017  
INVENTOR(S) : Kehoe et al.

Page 1 of 1

It is certified that error appears in the above-identified patent and that said Letters Patent is hereby corrected as shown below:

On the Title Page

Item (72) Inventors should read:  
(72) Inventors: Anthony Kehoe, Glenview, IL (US);  
                 John Lull, Glenview, IL (US);  
                 Bill Valentine, Glenview, IL (US);  
                 Chris Ellec, Glenview, IL (US);  
                 Berwin Banares, Glenview, IL (US)

Signed and Sealed this  
Fourth Day of September, 2018

Andrei Iancu  
*Director of the United States Patent and Trademark Office*